United States Patent [19]

Jordan, Jr.

[11] Patent Number: 5,063,502
[45] Date of Patent: Nov. 5, 1991

[54] INFORMATION CONTROL SYSTEM FOR COUNTING LOCK APPLICATION AGAINST COMPOSITE INFORMATION INFRASTRUCTURE

[75] Inventor: John D. Jordan, Jr., Worthington, Ohio

[73] Assignee: AT&T Bell Laborabories, Murray Hill, N.J.

[21] Appl. No.: 452,095

[22] Filed: Dec. 18, 1989

[51] Int. Cl.$^5$ .............................................. G06F 15/40
[52] U.S. Cl. .................................. 395/725; 364/246.6; 364/246.8; 364/282.1; 364/282.2; 364/DIG. 1
[58] Field of Search ................................. 364/200, 900

[56] References Cited

U.S. PATENT DOCUMENTS

| | | | |
|---|---|---|---|
| 4,604,694 | 8/1986 | Hough | 364/200 |
| 4,627,019 | 12/1986 | Ng | 364/900 |
| 4,677,550 | 6/1987 | Ferguson | 364/200 |
| 4,698,752 | 10/1987 | Goldstein et al. | 364/200 |
| 4,716,528 | 12/1987 | Crus et al. | 364/300 |
| 4,823,310 | 4/1989 | Grand | 364/900 |
| 4,827,411 | 5/1989 | Arrowood et al. | 364/300 |
| 4,827,508 | 5/1989 | Shear | 380/4 |
| 4,914,569 | 4/1990 | Levine et al. | 364/200 |
| 4,937,736 | 6/1990 | Chang et al. | 364/200 |
| 4,965,719 | 10/1990 | Shoens et al. | 364/200 |

OTHER PUBLICATIONS

"Locking Architecture in a Multiple Virtual Memory Multi-Processing System", IBM Technical Disclosure Bulletin, vol. 16, No. 7, Dec. 1973.
"Sharing of Disk Files Without Locking", IBM Technical Disclosure Bulletin, vol. 22, No. 7, Dec. 7, 1979 pp. 2887-2885.
"Integrated Concurrency and Shared Buffer Coherency Control for Multi-System", IBM Electrical Disclosure Bulletin, vol. 28, No. 10, Mar. 1986, pp. 4642-4680.
"Index mini-pages" IBM Technical Disclosure Bulletin, vol. 25, No. 11A, Apr. 1983, 5460-5463.
"Multilevel locking with deadlock avoidance", IBM Technical Disclosure Bulletin, vol. 21, No. 4, Sep. 1978, pp. 1723-1728.
"Efficient Locking for Concurrent Operation on B-Trees", ALM Translation on database system, vol. 6, No. 4, Dec. 1981, pp. 650-670.
"Transaction Monitoring in Encompass (TM): Reliable Distributed Transaction Processing", by Barr, Proceedings International Conference on Very Large Data Base, Sep. 1981, pp. 244-254.
"Index locking and splitting", IBM Technical Disclosure Bulletin, vol. 25, No. 7B Dec., 1985, pp. 3725-3927.
"Concurrent operation on B-Trees with overtaking", by Sagiracm Sigact-Sigmond symposium on Principles of Database System Mar., 1985, pp. 28-37.
"Locking Protocols for Concurrent Operations on B-Trees" IBM Technical Disclosure Bulletin, vol. 19, No. 10, Mar. 1977, pp. 3887-3889.

Primary Examiner—Michael R. Fleming
Assistant Examiner—Ayaz R. Sheikh
Attorney, Agent, or Firm—Dwight A. Marshall

[57] ABSTRACT

Apparatus and method for controlling concurrent process access of infrastructures comprising tree structures of complex object nodes. Apparatus associated with each complex object node records an accumulate count of each type of lock applied by concurrently running computer processes against each infrastructure complex node. The apparatus and method respond to lock application and removal requests of concurrently running computer processes for incrementing and decrementing an accumulative count of locks currently pending against a process selected complex node and accumulative counts of locks currently pending against ancestral complex nodes located in a tree structure of the process selected complex node to maintain a current record of selective locks applied to each infrastructure complex node thereby enabling read and write of information into and from complex nodes of the infrastructure.

17 Claims, 5 Drawing Sheets

OTHER PUBLICATIONS

"Multi-access Data Sharing Facility Utilizing Magnetic Bubble Storage", IBM Technical Disclosure Bulletin, vol. 23, No. 8 Jan. 1981, pp. 3882-3885.

"The Ubiquitous B-Tree", Computer Surveys, vol. 11, No. 2, Jun. 1979 pp. 121-137.

"Operating System—An Advanced Course," Messrs. M. J. Flynn, J. N. Gray, A. K. Jones, K. Lagally, H. Opderbeck, G. J. Popek, B. Randel, J. H. Saltzer and H. R. Wiehle, *Springer-Verlag,* New York—Berlin—Heidelberg—Tokyo, Third printing, 1984, pp. 430 through 450.

"Object—Oriented Concepts and Data Bases and Applications," Messrs. Won Kim and F. H. Lochovsky, *Addison-Wesley,* 1989, pp. 270 through 273.

2010 → TABLE 1

| TYPE LOCK | ANCESTOR LOCK |
|---|---|
| TREE EXCLUSIVE (TE) | INTERMEDIATE EXCLUSIVE (IE) |
| NODE EXCLUSIVE (NE) | INTERMEDIATE EXCLUSIVE (IE) |
| TREE RESERVE (TR) | INTERMEDIATE RESERVE (IR) |
| NODE RESERVE (NR) | INTERMEDIATE RESERVE (IR) |
| INTERMEDIATE RESERVE (IR) | INTERMEDIATE RESERVE (IR) |
| INTERMEDIATE EXCLUSIVE (IE) | INTERMEDIATE EXCLUSIVE (IE) |
| TREE SHARE (TS) | INTERMEDIATE SHARE (IS) |
| NODE SHARE (NS) | INTERMEDIATE SHARE (IS) |
| INTERMEDIATE SHARE (IS) | INTERMEDIATE SHARE (IS) |

FIG. 3

2011 → TABLE 2

|    | TE | NE | TR | NR | IR | IE | TS | NS | IS |
|----|----|----|----|----|----|----|----|----|----|
| TE | ✓ | ✓ | ✓ | ✓ | ✓ | ✓ | ✓ | ✓ | ✓ |
| NE | ✓ | ✓ | ✓ | ✓ |   |   | ✓ | ✓ |   |
| TR | ✓ | ✓ | ✓ | ✓ | ✓ | ✓ |   |   |   |
| NR | ✓ | ✓ | ✓ | ✓ |   |   |   |   |   |
| IR | ✓ |   | ✓ |   |   |   |   |   |   |
| IE | ✓ |   | ✓ |   |   |   | ✓ |   |   |
| TS | ✓ | ✓ |   |   |   | ✓ |   |   |   |
| NS | ✓ | ✓ |   |   |   |   |   |   |   |
| IS | ✓ |   |   |   |   |   |   |   |   |

INFORMATION CONTROL SYSTEM FOR COUNTING LOCK APPLICATION AGAINST COMPOSITE INFORMATION INFRASTRUCTURE

CROSS-REFERENCE TO RELATED APPLICATIONS

This application is related to the following applications, which are assigned to the same assignee and concurrently filed herewith:

J. D. Jordan, Jr., Case 1, "Information Control System";

J. D. Jordan, Jr., Case 2, "Information Control System";

J. D. Jordan, Jr., Case 3, "Information Control System"; and

J. D. Jordan, Jr., Case 5, "Information Control System."

TECHNICAL FIELD

The invention relates to apparatus and method for controlling concurrent process operations against composite information infrastructures.

BACKGROUND AND PROBLEM

Composite infrastructures used with computer systems oftentimes have an information architecture environment which has a number of interconnected complex object nodes. Each object node may have independent tree-like structures comprising hierarchies of interconnected complex subordinate object nodes of information wherein each subordinate object node may further comprise independent sub-tree structures of interconnected sub-nodes of information.

Computer systems using the infrastructures may run processes wherein the processes concurrently access the infrastructures. In particular, a computer system may run a number of processes each requiring access to complex infrastructures comprising data base architectures. A process may require access to one, several or all of the infrastructure nodes many times during the running of the process. In order to insure continuity of operation, a process may apply an exclusive lock against a node that will operate against the node and against all the lower hierarchical subordinate and sub-nodes in the tree structure of the locked node to allow only the process holding the exclusive lock to write into and read information from the locked node. In addition, all ancestor nodes of the node assigned an exclusive lock are assigned an intermediate exclusive lock to ensure consistency of information. During the time that a process holds the exclusive lock, other processes concurrently running on computers served by the complex infrastructures are prevented from writing into and reading information from the node and subordinate and sub-nodes located in the tree structure of the node to which the exclusive lock was applied. A process may also apply a share lock against a node, the node subservient tree structure and an intermediate share lock against ancestor nodes of the share locked node that allows the process and other processes to only read information from the nodes but which operates to prevent a process from applying an exclusive lock thereto.

A problem arises during the operation of multiple processes in that several concurrently running processes may be required to apply and remove locks to and from various ones of the infrastructure nodes at widely varying times during the running of the processes. Another problem arises in that some way is required to keep a running account of each type of lock that is applied to and removed from each infrastructure node during the running of computer processes.

SOLUTION

The foregoing problems are solved by apparatus and method arranged for controlling computer concurrent process operations against a complex infrastructure comprising tree structures of complex object nodes containing information wherein apparatus associated with each of the complex object nodes records an accumulative count of locks applied by concurrently running processes against each infrastructure complex node. The apparatus and method responds to lock application and removal requests of concurrently running processes by incrementing and decrementing an accumulative count of locks currently pending against a process selected complex node and accumulative counts of locks currently pending against ancestral complex nodes located in a tree structure of the process selected complex node to maintain a current record of selective locks applied by computer processes to each infrastructure complex node.

Apparatus responds to a process requesting a node lock by selecting the node and generating a list of ancestral nodes related to and located in a tree structure of the selected node. The compatibility of an intermediate lock corresponding with the requested lock is compared with a current lock status of each listed ancestral node. The accumulative count of a register corresponding with the type of intermediate lock is incremented upon determination of the compatibility of the intermediate lock with each ancestral node current lock status to record that the intermediate lock is currently pending against the ancestral node. After incrementing the ancestral node registers and upon comparing a compatibility of the requested lock with the selected node current lock status, the accumulative count of a register corresponding with the selected node is incremented to record the requested lock as pending against the selected node and the selected node is locked in accordance with the requested lock.

The apparatus and method responds to a process request for a removal of a node lock by selecting the node and generating a list of ancestral nodes located in the tree structure of the selected node. Apparatus is operative upon selecting the node and generating the list of ancestral nodes for decrementing the accumulative count of each register corresponding with the selected and listed ancestral nodes as an indication that the requested lock is removed and no longer pending against both selected and listed ancestral nodes.

DETAILED DESCRIPTION

Figure 1:
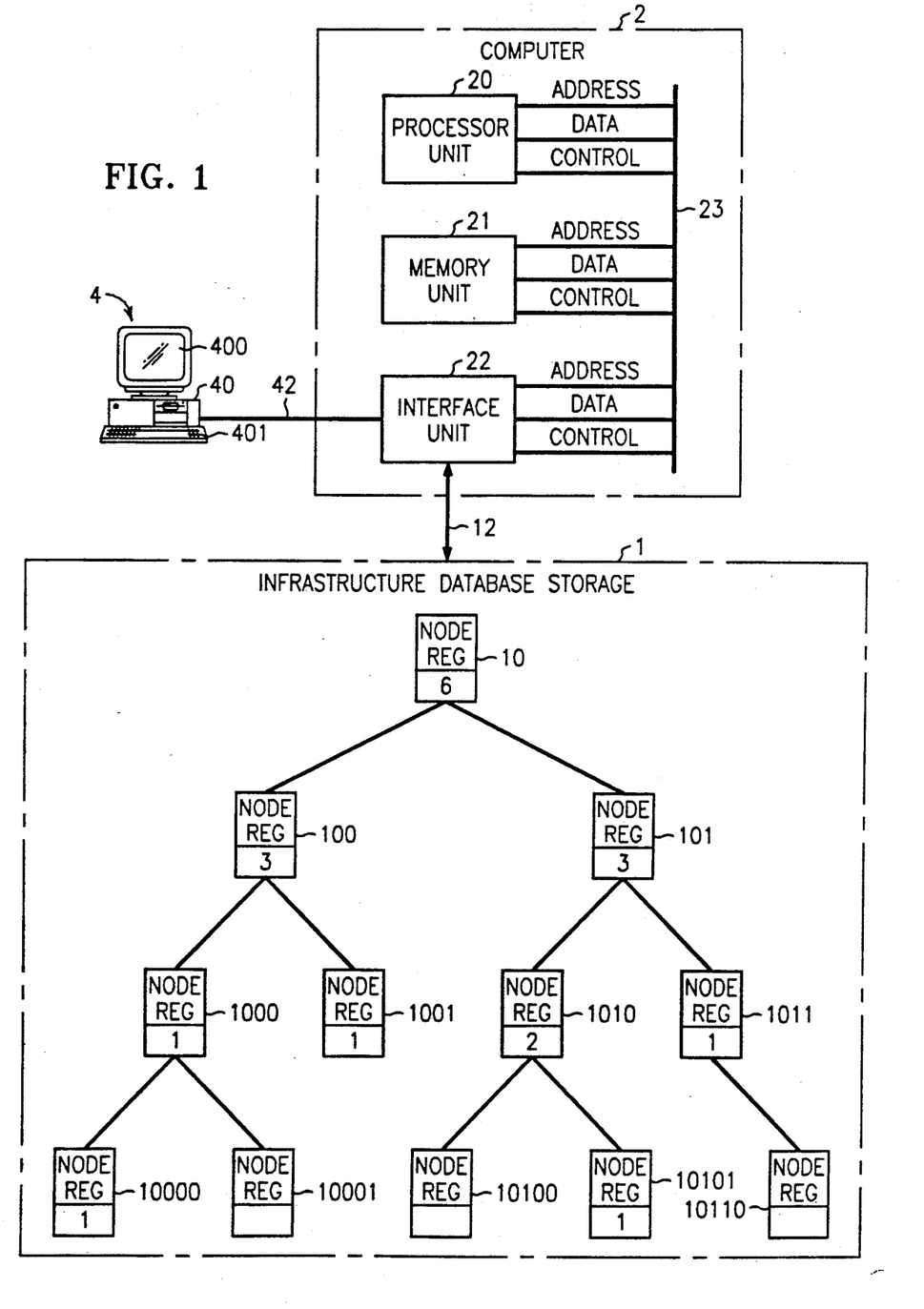
FIG. 1 illustrates an information control system embodying the principles of the invention.

In an exemplary embodiment of the invention, FIG. 1, a control information system has a storage system, such as a data base system, that may be located in storage apparatus intended for use with a single or a number of computer systems such as computer 2. A data base, hereinafter referred to as infrastructure 1, may have a single or number of infrastructures 1 stored therein that may be used by processes that are running within computer 2. Each infrastructure 1 may comprise information required for the operation of processes or may be software programs and macros that may be accessed at various times during the operation of a process and used by the process in the execution of various process features.

A typical information infrastructure, such as infrastructure 1, may have a root node 10 and a number of interconnected complex nodes 100, 101 each of which may, in an embodiment of the invention, be a file of information. Each complex node 100, 101, hereinafter referred to as a file node 100, 101, may have independent tree-like structures comprising hierarchies of interconnected complex subordinate nodes 1000, 1001, 1010, 1011 which may be blocks of information and which are hereinafter referred to as block node 1000, 1001, 1010, 1011. A complex subordinate node, or block node 1000, 1001, 1010, 1011 may further have independent sub-tree structures of interconnected sub-nodes 10000, 10001, 10100, 10101, 10110 of information and which are hereinafter referred to as information nodes. In the embodiment of the invention, infrastructure 1 has two file nodes 100, 101 interconnected with root node 10. File node 100, for example, may have two independent tree structures, one tree structure which includes block node 1001 and the other tree structure a two level hierarchy tree structure comprising block node 1000. Block node 1000 has two dependent sub-tree structures one of which includes information node 10000 and the other sub-tree which includes information node 10001. File node 101 is also assumed to have two dependent tree structures, one tree structure which comprises a two level hierarchy of block node 1011 and infomation node 10110 and the other tree structure which comprises a two level hierarchy of block node 1010 which in turn has a sub-tree structure comprising information nodes 10100, 10101. It is to be understood that other configurations of infrastructure 1 are within the teaching of the invention and the invention is not limited by the specific structure of infrastructure 1.

Infrastructure 1 may be accessed by one or a number of computers such as computer 2. Computer 2 may be any of a number of different types of computers such as an AT&T 3B2-400 and 3B2-310 simplex or duplex computer. Such computers need not be described in detail for an understanding of the invention and in general have a processor unit 20, memory unit 21 and an interface unit 22 each connected by address, data and control leads to a bus 23. Interface unit 22 couples data links 12 and 42 extending, respectively, to data storage devices, such as infrastructure 1 and computer terminal 4, with bus 23 so that data may be exchanged with processor unit 20 by computer terminal 4 and infrastructure 1.

Computer terminal 4, which may be any of a number of well-known computer terminals or personal computers, is coupled to interface unit 22 so that data may be entered into and read from processor unit 20 and memory unit 21 by computer terminal 4. Computer terminal 4 may have, but not necessarily limited thereto, a processor unit 40, an input device such as keyboard 401 and a display device similar to CRT terminal 400.

It is to be understood that infrastructure 1 may be located remote from computer 2 and coupled therewith by data links 12. In addition, infrastructure 1, within an embodiment of the invention, may be coupled to a large number of computers 2 either by data links, such as data link 12, or by a communication network sometimes referred to as a ring or star type of network. Although FIG. 1 of the drawing shows infrastructure 1 coupled by data link 12 with interface unit 22, it is to be understood that infrastructure 1 could be resident as a data base in a memory storage device that could be a part of a mainframe computer 2 and coupled with data bus 23 such that processes controlling the operation of computer 2 could access infrastructure 1.

Figure 2:
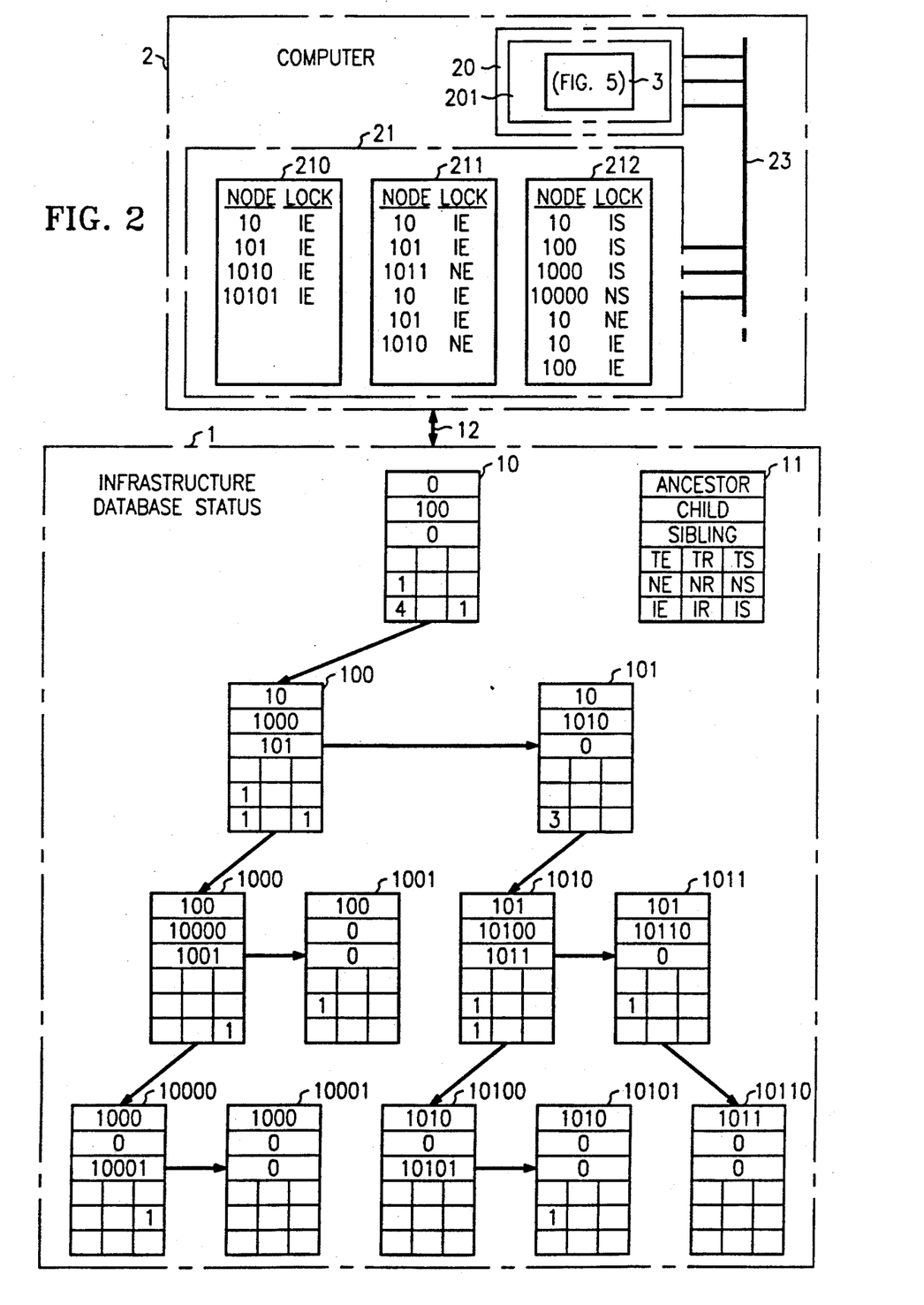
FIG. 2 sets forth illustrative processes and lock registers used with the information control system of FIG. 1.

Referring to FIG. 2, each complex node of infrastructure 1 is configured in accordance with key 11 wherein each node has ancestor information identifying the ancestor of the node. In addition, each node has pointer information therein identifying a dependent child of the node and information identifying a sibling node having the same ancestor as the node. For example, block node 1010 has ancestor information identifying file node 101 as a direct ancestor of block node 1010. The child pointer information identifies information node 10100 as a child of block node 1010, and the sibling information identifies sibling block node 1011 having the same ancestor node 101 as does block node 1010.

Associated with each complex node of infrastructure 1 is information indicating the current lock status of the node. Such information is assumed for the present embodiment of the invention to be a counting register, although not limited thereto. A counting register, shown in key 11, records an accumulative count indicating a current lock status of a node of infrastructure 1. For example, a node counting register may indicate that multiple locks have been imposed on a node. Each node register maintains an accumulative count indicating that node exclusive NE, share NS and reserve NR locks, in addition to intermediate exclusive IE, share IS and reserve IR locks, may have been imposed on a node. As an example, root node 10 register, FIG. 1, indicates that 6 locks, FIG. 2, including 1 node exclusive NE, 4 intermediate exclusive IE and 1 intermediate share IS locks have been applied to root node 10.

In the operation of the present embodiment of the invention, processes 210, 211, 212, resident in memory unit 21 of a network computer, such as computer 2, are run in processor unit 20 with program 3 to control access to node information within infrastructure 1. If process 210 requires the reading of information from information node 10101, computer 2 obtains access of infrastructure 1, FIG. 1, via bus 23, interface unit 22 and data link 12 and may select information node 10101 directly or root node 10. Root node 10 register initiates the selection of information node 10101, FIG. 2, by child pointer data which identifies child file node 100. File node 100 directs process 210 to sibling file node 101 which in turn points to child block node 1010. Block node 1010 directs process 210 to child information node 10100 which in turn directs process 210 to sibling information node 10101. In order to write into or read information from information node 10101, process 210, via operation of program 3, must determine the current lock status of information node 10101, FIG. 1, ancestor block node 1010, file node 101 and root node 10.

Computers, such as computer 2, having access to infrastructure 1, may run multiple process operations that require concurrent access to nodes of infrastructure 1. A process may enable the apparatus to selectively lock ones of the nodes and tree structures so as to lock a node and tree structure such that the process may write information into and read information from the locked node. The apparatus of the invention has registers associated with each of the nodes for recording an accumulative count of locks applied by concurrently running processes against each infrastructure complex node. When a process requests the application or the removal of a lock, computer 2, operating under control of program 3, responds to a lock application and removal request of concurrently running processes by incrementing and decrementing an accumulative count of a lock register associated with the process selected node and accumulative counts of lock registers associated with ancestral nodes located in a tree structure of the process selected complex node to maintain a current record of selective locks applied to each infrastructure node. Program 3 responds to a process request for a lock by selecting the appropriate node and lock identified by the process and generating a list of ancestral nodes related to the selected node. If, for example, process 211, FIG. 2, requests, that a node exclusive NE lock be applied against block node 1010, program 3 generates a list of ancestral nodes located in a tree structure related to selected block node 1010, FIG. 1, comprising root node 10, file node 101 and selected block node 1010.

Figure 3:
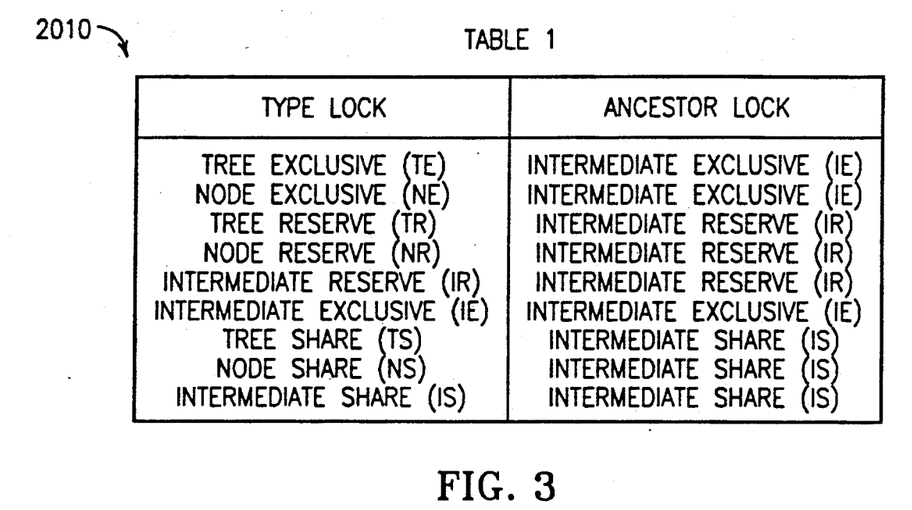
FIG. 3 sets forth an illustrative table showing a relationship of complex node and tree structure locks with corresponding intermediate locks applicable to ancestral nodes and tree structure related to a selected complex node and tree structure.

The apparatus, operating under control of program 3, FIG. 2, selects root node 10 from the generated list of ancestral nodes and determines that a lock is to be applied against root node 10. Program 3, in accordance with table 1, FIG. 3, determines that an intermediate exclusive IE lock is required to be applied against an ancestral node, such as root node 10, when the requested node exclusive NE lock is to be applied against a child node such as block node 1010. The compatibility of the intermediate type of lock corresponding with the requested lock as determined by table 1, is compared, FIG. 4, table 2, with the current lock status of each listed ancestral node of the selected node such as ancestor root and file nodes 10, 101. The present embodiment of the invention indicates that each lock applied against a node or tree structure, FIG. 2, is recorded as an accumulative count of a lock register identifying a current lock status in format 11 corresponding with each node. As set forth in compatibility table 2, FIG. 4, intermediate exclusive IE lock is compatible with node and intermediate share NS, IS locks, node and intermediate reserve NR, IR and with node and intermediate exclusive NE, IE locks. It is assumed that five locks, such as 3 intermediate exclusive IE and 1 node exclusive NE and intermediate share IS locks, are currently pending against root node 10 and 2 locks, such as 2 intermediate exclusive IE locks, are currently pending against ancestor file node 101. Thus, intermediate exclusive IE lock corresponding with the selected node exclusive NE lock may be applied against ancestral root and file nodes 10, 101 even though the current register status of these nodes indicate that node exclusive NE and intermediate exclusive IE and share IS locks are currently pending against ancestral root and file nodes 10, 101.

Program 3, operative upon determination of the compatibility of the intermediate exclusive IE lock with the current lock status of each ancestral root and file node 10, 101, increments an accumulative count of the intermediate exclusive IE lock register corresponding with each ancestral root and file nodes 10, 101 by 1 to record that the intermediate exclusive IE lock corresponding with the requested node exclusive NE lock is pending against ancestral root and file nodes 10, 101. Thus, the accumulative count of root node 10 intermediate exclusive IE lock register is advanced from 3 to 4 and the accumulative count of file node 101 intermediate exclusive IE lock register is advanced from 2 to 3 to record that another intermediate exclusive IE lock is currently pending against ancestral root and file nodes 10, 101.

After incrementing all of the accumulative counts of the intermediate said selected lock registers corresponding with the ancestral nodes of the selected node, the apparatus determines the compatibility of the selected node exclusive NE lock with the current lock status of selected block node 1010. Since it was assumed that only an intermediate exclusive IE lock is pending against block node 1010, program 3, in accordance with table 2, FIG. 4, determines that the requested node exclusive NE is compatible with the intermediate exclusive IE currently pending against block node 1010. Program 3 is then operative for incrementing an accumulative count of a node exclusive NE lock register corresponding with the selected node by 1 to record that the requested node exclusive NE lock is being applied against selected block 1010. Block node 1010 is then locked in accordance with the standards of the applied node exclusive NE lock and process 211 is enabled access to block node 1010 in accordance with the requirements of the requested node exclusive NE lock and the current lock status of block node 1010.

Program 3 in response to a process, for example process 212, FIG. 2, requesting a removal of a node lock, such as the node exclusive NE lock currently pending against file node 100, selects file node 100 and generates a list of ancestral nodes including root node 10 and file node 100 located in the tree structure of the selected node. Upon selecting file node 100 and generating a list of ancestral nodes thereof, program 3 decrements an accumulative count of each type of lock register corresponding with listed ancestral root node 10 and selected file node 100 by 1 as an indication that the requested node exclusive NE lock and the intermediate exclusive IE lock corresponding therewith have been removed and are no longer pending against file and ancestral root nodes 100, 10.

In the present embodiment of the invention, it is assumed that initially five locks, such as 3 intermediate exclusive IE, 1 node exclusive NE and intermediate share IS locks, are currently pending against root node 10 and 2 locks, such as intermediate exclusive IE locks, are currently pending against file node 101. It is further assumed that process 211, currently running on computer 2, has a requirement to place a node exclusive NE lock on block node 1010. Program 3, running under control of process 211, FIG. 5, selects block node 1010, step 301, and the type of node lock, such as node exclusive NE lock, to be applied to selected block node 1010, step 302. Program 3 then generates a list of appropriate ancestor nodes, step 303, for the node selected in step 301. The ancestor list for block node 1010, FIG. 1, includes root node 10, file node 101 and block node 1010. It is determined that process 211 is to apply locks, FIG. 5, step 304.

Figure 4:
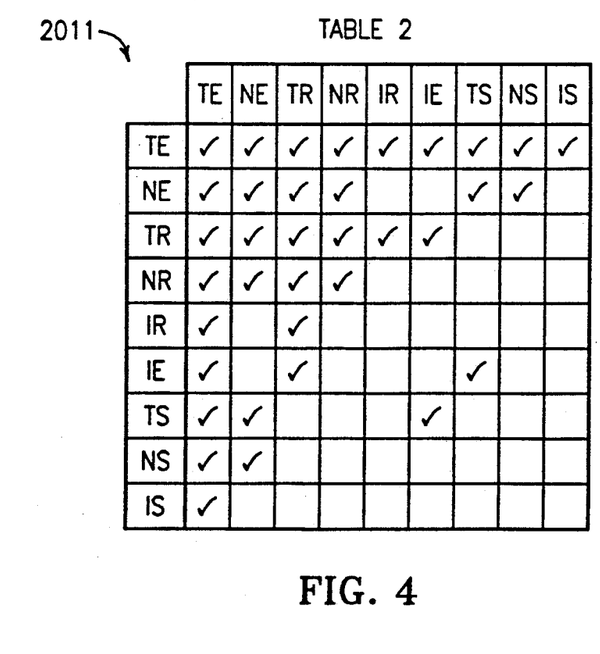
FIG. 4 illustrates an illustrative table setting forth a compatibility of requested locks with current lock status of selected nodes and tree structures and node and tree structures that are ancestors of a selected node and tree structures.
Figure 5:
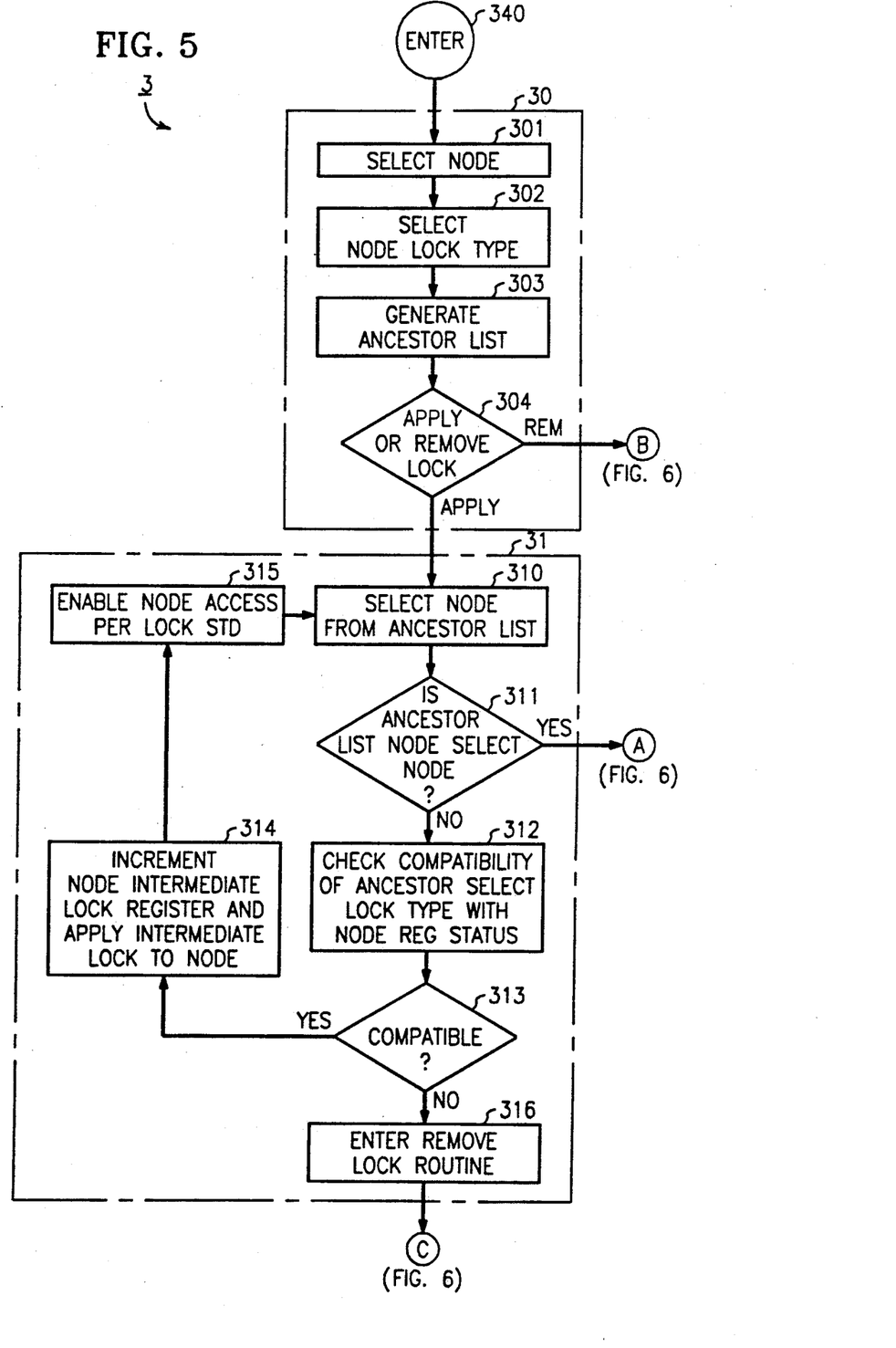
FIGS. 5 and 6 illustrates a flow chart of the operation of the control information system set forth in FIG. 1 in accordance with the principles of the invention.

Program 3, FIG. 5, step 310, selects the first ancestor node, root node 10, and determines if the ancestor list node is the select node, step 311. Since root node 10 is not the select block node 1010, program 3 determines from table 1, FIG. 3, that an intermediate exclusive IE lock is required for each ancestor node when a node exclusive NE lock is to be applied to a selected child node. Program 3 proceeds to determine the compatibility of the intermediate exclusive IE lock, step 312, by comparing intermediate exclusive IE lock with locks previously applied to root node 10. When it is determined, step 313, that intermediate exclusive IE lock, table 2, FIG. 4, is compatible with the node and intermediate exclusive NE, IE and the intermediate share IS locks that have previously been applied to root node 10, program 3 increments the accumulative count 3 of the intermediate exclusive IE lock register corresponding with ancestral root node 10 by 1 to record that 4 intermediate exclusive IE locks are currently pending against ancestral root node 10, step 314. The intermediate exclusive IE is applied to root node 10 and access granted to process 211 in accordance with the current lock status and lock standards as indicated by the lock registers corresponding with root node 10, step 315.

Program 3, FIG. 5, step 31, continues to compare the compatibility of the intermediate exclusive IE lock for each listed ancestral node of block node 1010 with a current lock status of the ancestral node as recorded in the ancestral node lock registers by repeating steps 310 through 315. Since intermediate exclusive IE lock is compatible, FIG. 4, table 2, with the current lock status of the lock registers associated with file node 101 indicating that 2 intermediate exclusive IE locks are currently pending against file nodes 101, the intermediate exclusive IE lock register associated with file node 101 originally showing accumulative count 2 is incremented by 1 to indicate that an intermediate exclusive IE lock has been applied to file node 101 and that 3 intermediate exclusive IE locks are currently pending against file node 101.

After incrementing the intermediate exclusive registers of ancestor root and file nodes 10, 101 to indicate that intermediate exclusive IE locks have been applied thereto, step 31, FIG. 5, program 3 selects the next node from the ancestor list, step 310, and determines that the ancestor list node, block node 1010, step 311, is the select node. The requested or selected type of lock, FIG. 6, step 320, to be applied to block node 1010, a node exclusive NE lock, is compared for compatibility, step 321, as set forth in table 2, FIG. 4, with previously set locks recorded by the lock registers associated with block node 1010, FIG. 2. Since it is assumed that block node 1010 presently has a pending intermediate exclusive IE lock, it is determined that the selected node exclusive NE lock, table 2, FIG. 4, is compatible with the current lock status of block node 1010, step 3218 FIG. 6. Accordingly, the current accumulative count 0 of the node exclusive NE lock register associated with block node 1010 is incremented by 1 to record that a node exclusive NE lock has been applied to block node 1010, step 322, and access is granted to block node 1010 in accordance with the standards of the locks recorded by the lock registers associated with block node 1010. Program 3, step 323, establishes a node and tree record of the locks currently applied to infrastructure 1, FIG. 2, by and in process 211 indicating that a node exclusive NE lock has been applied to block node 1010 and intermediate exclusive IE locks applied to ancestor nodes of block node 1010 comprising file node 101 and root node 10. Program 3 then grants process 211 access to block node 1010 in accordance with the standards of the locks currently pending against block node 1010, FIG. 6, step 323, and exits from the lock sequence, step 341.

If, during the sequence of comparing the compatibility of an intermediate type of lock with the current lock status of an ancestor node, it is determined that the intermediate type of lock is incompatible with the current lock status of the ancestral node, FIG. 5, step 313, any locks previously applied to ancestral nodes during this run of program 3 will be removed. When it is determined that the intermediate type of lock is incompatible with the current lock status of an ancestor node, step 313, program 3 enters the remove lock sequence, step 316. The remove lock sequence, FIG. 6, step 333, chooses the previous node from the ancestor list and decrements the accumulative count of a register recording a count of an intermediate type of lock corresponding with the select lock for an ancestor node by 1, step 331. If the ancestor list node is not the root node, step 332, steps 333 and 331 are repeated until the appropriate lock has been removed from the root node. When it is determined that the chose node is the root node, step 332, and there is a compatibility failure, step 334, program 3 indicates a lock failure, step 335, and exits the lock sequence.

Should it be determined that the requested lock is not compatible with the current lock status recorded by the lock registers associated with the select node, step 321, it is necessary to remove all intermediate locks that have previously been applied to ancestral nodes of the select node during the current operation of program 3. Thus, if the select node exclusive NE lock had been incompatible with the current lock status of select block node 1010, step 321, program 3 would ask if the current node is the root node, step 324. Since block node 1010 is not root node 10, program 3 proceeds to remove lock sequence 33 and chooses the previous node, file node 101, from the ancestor list, step 333. The accumulative account 3 of the intermediate exclusive IE lock register associated with file node 101 is decremented by 1 to indicate that the intermediate exclusive IE lock previously applied to file node 101 is now removed, step 331. Program 3 then determines if the node is the root node, step 332. Since file node 101 is not root node 10, remove lock sequence 33 chooses the previous node, root node 10, from the ancestor list, step 333, and decrements the accumulative count 4 of the intermediate exclusive IE lock register associated with root node 10 by 1, step 331, to indicate that the intermediate exclusive IE lock previously applied to ancestor root node 10 has been removed and that 3 intermediate exclusive IE locks are still pending against root node 10. Since the node is root node 10, step 332, and it is assumed that the present select lock is not compatible with the current lock status of select block node 1010, step 334, program 3 indicates a lock failure, step 335, and exits the lock sequence.

It is assumed, FIG. 2, that process 212 requests that a node exclusive NE lock be applied against root node 10 and that root node 10 currently has 4 pending intermediate exclusive IE and 1 intermediate share IS locks. Program 3 responds to the lock request by selecting root node 10, FIG. 5, step 301, and node exclusive NE lock, step 302. The ancestor list comprising root node 10 is generated, step 303, and it is determined that a lock is to be applied to the select node, step 304. Root node 10 is selected from the ancestor list, step 310, and since the selected root node 10 is the select node, step 311, program 3 compares the compatibility of the selected node exclusive NE lock with the current lock status of root node 10, FIG. 6, step 320. Table 2, FIG. 4, shows, by the absence of a check mark, that a node exclusive NE lock is compatible with the intermediate exclusive and share IE, IS locks assumed to be pending against root node 10, step 321, and program 3 increments the accumulative count, presently assumed 0, of the node exclusive NE lock register corresponding with root node 10 by 1, to show that a node exclusive NE lock has been applied to root node 1, step 322. A process node record, FIG. 2, is established in process 212 indicating that process 212 has applied a node exclusive NE lock to root node 10, FIG. 6, step 323, and access is granted process 212 to root node 10 in accordance with the standards of the applied locks. Program 3 then exits lock sequence, step 341.

Figure 6:
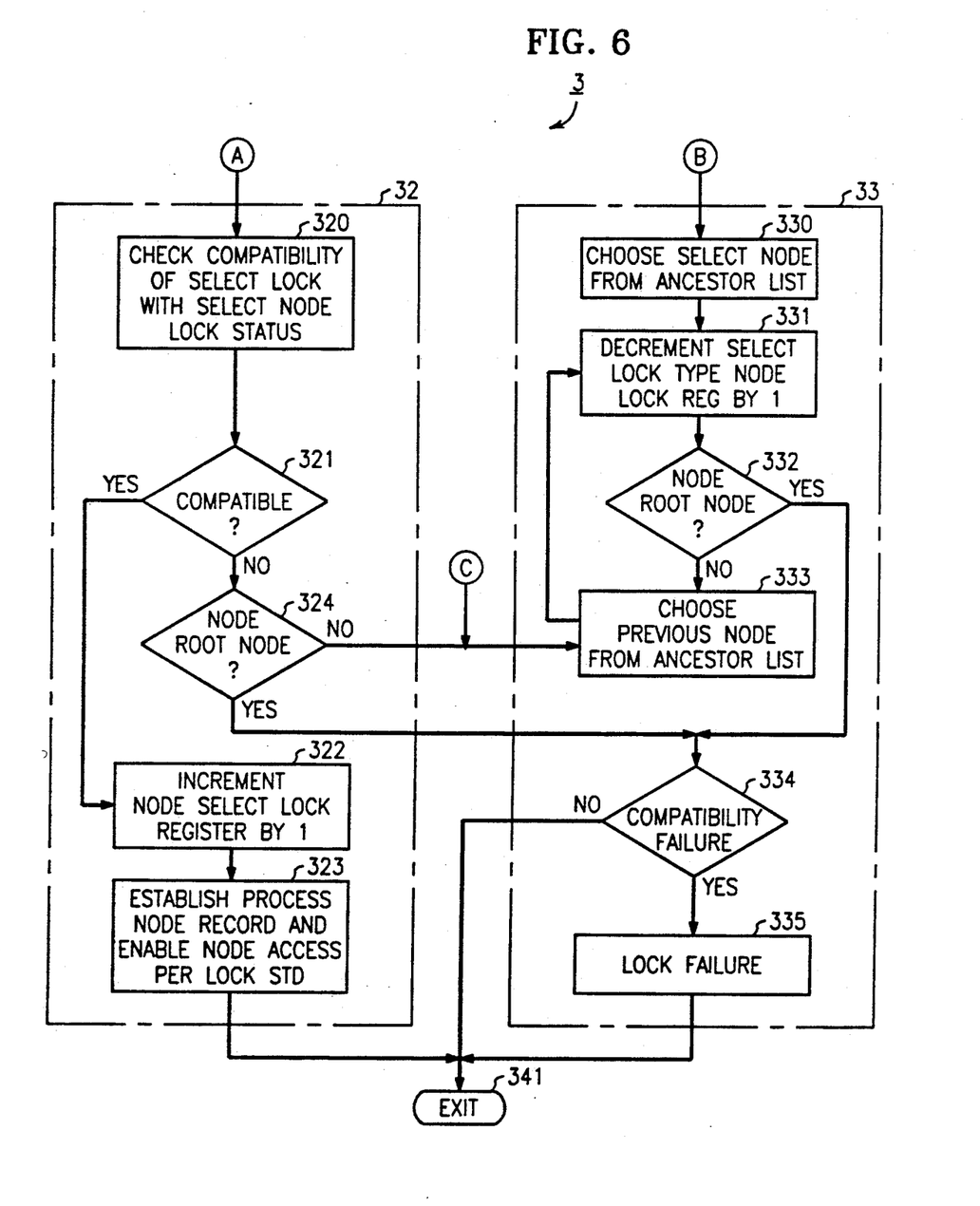

If the select node exclusive NE lock is incompatible, as shown by the presence of a check mark, table 3, FIG. 4, with the current lock status of root node 10, FIG. 6, step 321, program 3 determines that the currently selected node is root node 10, step 324. Program 3, step 33, determines that there has been a compatibility failure, step 334, and indicates that there is a lock failure, step 335, before exiting from the lock sequence, step 341.

After completion of accessing a node, process 212 may, for example, elect to remove the node and intermediate exclusive NE, IE locks currently pending against file node 100 and root node 10, respectively, FIG. 2. Program 3 responds to a lock removal request, FIG. 5, by selecting the select file node 100 and the select node exclusive NE lock to be removed, steps 301, 302. A list of ancestor nodes, including root node 10 and select file node 100, is generated, step 303, and since locks are to be removed, step 304, program 3 enters the remove lock sequence 33, FIG. 6. The select node, file node 100, is chosen from the ancestor list, step 330, and the accumulative count of 1 recorded by node exclusive NE lock register corresponding with file node 100, is decremented by 1 to show that the node exclusive NE lock has been removed from select file node 100, step 331. Since file node 100 is not the root node, step 332, program 3 selects the previous node, root node 10, from the ancestor list, step 333, and decrements the accumulative count 4 of the intermediate exclusive IE register corresponding with root node 10 by 1 to show that an intermediate exclusive IE lock has been removed from root node 10. Since root node 10 is the root node, step 332, and there is no compatibility failure, step 335, program 3 exits the lock sequence.

I claim:

1. Apparatus for controlling concurrent process operations against a complex infrastructure comprising tree structures of complex object nodes wherein said apparatus comprises
    means associated with each of the nodes for recording an accumulative node count of selective node, tree and intermediate reserve, exclusive and share locks applied by concurrently running ones of the process operations against each node, and
    means responsive to lock application and removal requests of said concurrently running process operations for incrementing and decrementing an accumulative node and tree reserve, exclusive and share lock count of a process operation selected node and accumulative intermediate reserve, exclusive and share lock counts of ancestral nodes located in a tree structure of said process operation selected node to maintain a current record of node locks applied to each infrastructure node.

2. The infrastructure controlling apparatus set forth in claim 1 comprising
    means responsive to a process operation requesting one of said node and tree reserve, exclusive and share locks for a node for selecting said node and generating a list of ancestral nodes located in a tree structure related to said selected node.

3. The infrastructure controlling apparatus set forth in claim 2 comprising
    means operative upon selecting said node and generating said list of ancestral nodes for comparing a compatibility of an intermediate lock corresponding with said requested lock of each listed ancestral node with a current lock status of the ancestral node.

4. The infrastructure controlling apparatus set forth in claim 3 comprising
    means operative upon determination of said compatibility of said intermediate lock with each ancestral node current lock status for incrementing an accumulative count of a register corresponding with each ancestral node to record application of said intermediate lock corresponding with said requested lock as pending against the ancestral node.

5. The infrastructure controlling apparatus set forth in claim 4 comprising
    means enabled upon setting all ancestral node registers for incrementing an accumulative count of a register corresponding with said selected node to record said requested lock as being applied against said selected node and for locking said selected node in accordance with said requested lock and enabling access to said selected node in accordance with requirements of said applied requested lock.

6. The infrastructure controlling apparatus set forth in claim 5 comprising
    means responsive to a process operation requesting a removal of a lock from a locked node for entering a remove lock sequence by selecting said locked node and generating a list of ancestral nodes located in the tree structure of said selected locked node.

7. The infrastructure controlling apparatus set forth in claim 6 comprising
    means operative upon selecting said locked node and generating said list of ancestral nodes thereof for decrementing said accumulative count of each register corresponding with said selected locked node and listed ancestral nodes thereof as an indication that said requested lock is no longer pending against said selected locked node.

8. Apparatus for controlling concurrent process operations against a complex infrastructure comprising tree structures of complex object nodes wherein said apparatus comprises
    means responsive to a process requesting one of node and tree reserve, exclusive and share locks for a node for selecting said node and generating a list of ancestral nodes related to and located in a tree structure of said selected node, means operative upon selecting said node and generating said list of ancestral nodes for comparing a compatibility of an intermediate lock corresponding with said requested lock for each listed ancestral node with a current lock status of the ancestral node, means operative upon determination of said compatibility of said intermediate lock with each ancestral node current lock status for applying said intermediate lock to the ancestral node and incrementing an accumulative count of a register corresponding with the ancestral node to record application of said intermediate lock corresponding with said requested lock, means enabled upon incrementing all ancestral node registers and upon comparing a compatibility of said requested lock with said selected node current lock status for incrementing an accumulative count of a register corresponding with said selected node to record said requested lock as pending against said selected node and for locking said selected node in accordance with said requested lock, means responsive to a process requesting a removal of said requested lock from said selected locked node for entering a remove lock sequence by selecting said locked node and generating a list of intermediate locked ancestral nodes located in the tree structure of said selected locked node, and means operative upon selecting said locked node and generating said list of intermediate locked ancestral nodes for removing said selected and intermediate locks from said selected and each listed ancestral locked node and decrementing said accumulative count of each register corresponding with said selected and listed ancestral locked nodes as an indication that said requested lock and intermediate locks are removed and no longer pending against said previously locked selected and listed ancestral nodes.

9. A computer implemented method for controlling concurrent process operations against a complex infrastructure having tree structures of complex object nodes comprising the steps of applying node, tree and intermediate reserve, exclusive and share locks to the nodes in response to lock requests of ones of the process operations to selectively lock the nodes and recording an accumulative count of locks applied by the concurrently running process operations against each infrastructure node in a lock register corresponding with the infrastructure node, and incrementing and decrementing in response to lock application and removal requests of said concurrently running process operations a count of a lock register of a process operation selected node and counts of intermediate lock registers corresponding with ancestral nodes located in a tree structure of said process operation selected node to maintain a current record of locks applied to each infrastructure node.

10. The computer implemented method of controlling concurrent process operations against a complex infrastructure as set forth in claim 9 comprising the step of selecting a node in response to a process operation requesting a lock of said selected node and generating a list of ancestral nodes located in a tree structure related to said selected node.

11. The computer implemented method of controlling concurrent process operations against a complex infrastructure as set forth in claim 10 comprising the step of comparing a compatibility of an intermediate lock corresponding with said requested lock of each listed ancestral node with a current lock status of the ancestral node.

12. The computer implemented method of controlling concurrent process operations against a complex infrastructure as set forth in claim 11 comprising the step of incrementing an accumulative count of an intermediate lock register corresponding with the ancestral node upon determination of said compatibility of said intermediate lock with each ancestral node current lock status to record an application of said intermediate lock to the ancestral node.

13. The computer implemented method of controlling concurrent process operations against a complex infrastructure as set forth in claim 12 comprising the step of incrementing upon setting all intermediate lock registers of ancestral nodes of the selected node an accumulative count of a lock register corresponding with the selected node to record said requested lock as being applied against said selected node and for locking said selected node in accordance with said requested lock.

14. The computer implemented method of controlling concurrent process operations against a complex infrastructure as set forth in claim 13 comprising the step of entering a remove lock sequence by selecting a locked node in response to a process operation requesting a removal of a lock previously applied to said locked node and generating a list of intermediate locked ancestral nodes located in the tree structure of the selected locked node.

15. The computer implemented method of controlling concurrent process operations against a complex infrastructure as set forth in claim 14 comprising the step of decrementing upon selecting said locked node and generating a list of said intermediate locked ancestral nodes thereof said accumulative count of each lock register corresponding with said selected and listed ancestral locked nodes as an indication that said requested lock and corresponding intermediate locks have been removed and are no longer pending against said selected and listed ancestral locked nodes.

16. A computer implemented method for controlling concurrent process operations against a complex infrastructure having tree structures of complex object nodes comprising the steps of selecting a node in response to a process requesting a lock of said selected node and generating a list of ancestral nodes located in a tree structure related to said selected node, comparing a compatibility of an intermediate lock corresponding with said requested lock for each listed ancestral node with a current lock status of the ancestral node, incrementing an accumulative count of an intermediate lock register corresponding with an ancestral node upon determination of said compatibility of said intermediate lock with each ancestral node current lock status to record an application of said intermediate lock to the ancestral node, incrementing upon setting all intermediate lock registers corresponding with ancestral nodes of the selected node an accumulative count of a lock register corresponding with the selected node to record said requested lock as being applied against said selected node and for locking said selected node in accordance with said requested lock, entering a remove lock sequence in response to a process requesting a removal of lock previously applied to a locked node for selecting said locked node and generating a list of intermediate locked ancestral nodes located in the tree structure of said selected locked node, and decrementing upon selecting said locked node and generating a list of intermediate locked ancestral nodes thereof said accumulative count of each lock register corresponding with said selected locked node and listed intermediate locked ancestral nodes as an indication that said requested locks have been removed and are no longer pending against said selected and listed ancestral nodes.

17. Apparatus for controlling concurrent processes against a data base comprising tree structures of complex object nodes of information wherein said apparatus comprises register means associated with each node for recording accumulative counts of node, tree and intermediate reserve, exclusive and share locks selectively applied by concurrently running processes against the node, and means responsive to lock application and removal requests of ones of the processes for appling and removing ones of said locks to a process selected node and incrementing and decrementing said accumulative count of said register means of said process selected node and accumulative counts of said register means of ancestral nodes located in a tree structure of said process selected node to maintain a current record of selective locks applied to each data base node.

* * * * *